(12) United States Patent
Ikeda et al.

(10) Patent No.: US 9,770,967 B2
(45) Date of Patent: Sep. 26, 2017

(54) VEHICLE BATTERY MOUNTING STRUCTURE

(71) Applicant: TOYOTA JIDOSHA KABUSHIKI KAISHA, Toyota-shi, Aichi (JP)

(72) Inventors: Koki Ikeda, Toyota (JP); Kiyoshi Hokazono, Toyota (JP); Shinya Kamimura, Toyota (JP); Kentaro Nakamura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/105,279

(22) PCT Filed: Dec. 9, 2014

(86) PCT No.: PCT/JP2014/082578
§ 371 (c)(1),
(2) Date: Jun. 16, 2016

(87) PCT Pub. No.: WO2015/098504
PCT Pub. Date: Jul. 2, 2015

(65) Prior Publication Data
US 2016/0311301 A1 Oct. 27, 2016

(30) Foreign Application Priority Data
Dec. 25, 2013 (JP) .................................. 2013-267969

(51) Int. Cl.
*B62D 25/20* (2006.01)
*B60K 1/04* (2006.01)
(Continued)

(52) U.S. Cl.
CPC .............. *B60K 1/04* (2013.01); *B62D 21/157* (2013.01); *B62D 25/2036* (2013.01);
(Continued)

(58) Field of Classification Search
CPC .... B60K 2001/0416; B60K 2001/0438; B62D 21/157
(Continued)

(56) References Cited

U.S. PATENT DOCUMENTS 4,231,607 A * 11/1980 Bohlin ................. B60N 2/4235
293/128
6,040,080 A * 3/2000 Minami ................... B60K 1/04
429/100
(Continued)

FOREIGN PATENT DOCUMENTS

JP H07-156831 A 6/1995
JP H07-246845 A 9/1995
(Continued)

*Primary Examiner* — Jeffrey J Restifo
(74) *Attorney, Agent, or Firm* — Oliff PLC (57) ABSTRACT

A vehicle battery mounting structure includes: an energy absorption member that is provided at a vehicle body lower side of a floor panel, and that includes a first side wall portion sloping toward a vehicle body upper outside at a vehicle width direction inside of the energy absorption member, as viewed from a vehicle body longitudinal direction; and a battery frame made of resin that is disposed at the vehicle width direction inside of the first side wall portion, that supports a battery, and that includes a second side wall portion sloping toward the vehicle body upper outside at the vehicle width direction outside of the battery frame, as viewed from the vehicle body longitudinal direction, and facing the first side wall portion in the vehicle width direction.

4 Claims, 6 Drawing Sheets

(51) Int. Cl.
*B62D 21/15* (2006.01)
*B62D 29/00* (2006.01)

(52) U.S. Cl.
CPC .... *B62D 29/001* (2013.01); *B60K 2001/0438* (2013.01); *B60Y 2306/01* (2013.01)

(58) Field of Classification Search
USPC .................................. 180/68.5; 296/187.08
See application file for complete search history.

(56) References Cited

U.S. PATENT DOCUMENTS

| | | | | |
|---|---|---|---|---|
| 6,786,534 | B1* | 9/2004 | Peng | B60J 5/042 296/187.08 |
| 8,939,246 | B2* | 1/2015 | Yamaguchi | B60K 1/04 180/311 |
| 2004/0226765 | A1* | 11/2004 | Mathews | B60K 1/04 180/68.5 |
| 2007/0007060 | A1* | 1/2007 | Ono | B60K 1/04 180/65.31 |
| 2007/0215399 | A1* | 9/2007 | Watanabe | B60K 1/04 180/68.5 |
| 2008/0106119 | A1* | 5/2008 | Ma | B62D 21/157 296/187.12 |
| 2009/0146457 | A1* | 6/2009 | Kanagai | B62D 21/157 296/187.12 |
| 2009/0166116 | A1* | 7/2009 | Kiya | B60K 1/04 180/68.5 |
| 2009/0242298 | A1* | 10/2009 | Guss | B60K 1/04 180/68.5 |
| 2010/0207426 | A1* | 8/2010 | Tsuruta | B62D 21/157 296/187.12 |
| 2013/0026786 | A1* | 1/2013 | Saeki | B60K 1/04 296/187.12 |
| 2013/0075173 | A1* | 3/2013 | Kato | B60K 1/04 180/68.5 |
| 2013/0126255 | A1* | 5/2013 | Saeki | B60K 1/04 180/68.5 |
| 2013/0127200 | A1* | 5/2013 | Saeki | B60K 1/04 296/37.14 |
| 2013/0153318 | A1* | 6/2013 | Shirooka | B60K 1/04 180/68.5 |
| 2013/0270864 | A1* | 10/2013 | Young | B60K 1/04 296/187.12 |
| 2014/0008137 | A1* | 1/2014 | Shiromura | B60K 1/04 180/68.5 |
| 2014/0021744 | A1* | 1/2014 | Imamura | B62D 21/157 296/187.08 |
| 2014/0291046 | A1* | 10/2014 | Araki | B60K 1/04 180/68.5 |
| 2014/0338997 | A1* | 11/2014 | Okada | B62D 25/20 180/68.5 |
| 2015/0174996 | A1* | 6/2015 | Ikeda | B60K 1/04 180/68.5 |
| 2015/0249240 | A1* | 9/2015 | Hihara | B60K 1/04 180/68.5 |
| 2016/0083017 | A1* | 3/2016 | Sakaguchi | B62D 21/157 296/187.12 |
| 2016/0090003 | A1* | 3/2016 | Hirota | B60L 11/1877 180/68.5 |
| 2016/0114667 | A1* | 4/2016 | Ikeda | B60K 1/04 180/68.5 |
| 2016/0114699 | A1* | 4/2016 | Hokazono | B60L 11/1877 180/68.5 |
| 2016/0200191 | A1* | 7/2016 | Ito | B60K 15/073 280/834 |
| 2016/0236713 | A1* | 8/2016 | Sakaguchi | B60K 1/04 |
| 2016/0248059 | A1* | 8/2016 | Katayama | H01M 2/1083 |
| 2016/0250915 | A1* | 9/2016 | Kobukata | B60K 1/04 180/68.5 |
| 2016/0257187 | A1* | 9/2016 | Nakajima | B60K 1/04 |
| 2016/0257346 | A1* | 9/2016 | Wu | B62D 21/157 |
| 2016/0288636 | A1* | 10/2016 | Kamimura | B60K 8/00 |
| 2016/0311301 | A1* | 10/2016 | Ikeda | B62D 29/001 |

FOREIGN PATENT DOCUMENTS

| | | |
|---|---|---|
| JP | 3606415 B2 | 1/2005 |
| JP | 2006-182295 A | 7/2006 |
| JP | 2007-039004 A | 2/2007 |
| JP | 2013-028191 A | 2/2013 |
| JP | 2013-256265 A | 12/2013 |
| JP | 2014-080116 A | 5/2014 |

\* cited by examiner

VEHICLE BATTERY MOUNTING STRUCTURE

TECHNICAL FIELD

The present invention relates to a vehicle battery mounting structure.

BACKGROUND ART

Structures are hitherto known in which a battery frame for housing a drive battery disposed at the lower side of a floor section of an electric vehicle is molded in fiber reinforced plastic (FRP) material, and fixed to side frames (under members) disposed at the left and right of a lower face of the floor section (see, for example, Japanese Patent No. 3606415).

SUMMARY OF INVENTION

Technical Problem

However, when localized collision load is input to a battery frame made of resin during a side-on collision of the vehicle, sometimes cracks (or breaking) may occur in the battery frame. There is accordingly room for improvement of such structures with respect to suppressing the occurrence of cracks in a battery frame made of resin during a side-on collision of the vehicle.

Thus, an object of the present invention is to obtain a vehicle battery mounting structure capable of suppressing the occurrence of cracking of a battery frame made of resin during a side-on collision of the vehicle.

Solution to Problem

In order to achieve the above object, a vehicle battery mounting structure of a first aspect according to the present invention includes: an energy absorption member that is provided at a vehicle body lower side of a floor panel, and that includes a first side wall portion sloping toward a vehicle body upper outside at a vehicle width direction inside of the energy absorption member, as viewed from a vehicle body longitudinal direction; and a battery frame made of resin that is disposed at the vehicle width direction inside of the first side wall portion, that supports a battery, and that includes a second side wall portion sloping toward the vehicle body upper outside at the vehicle width direction outside of the battery frame, as viewed from the vehicle body longitudinal direction, and facing the first side wall portion across a gap in the vehicle width direction.

In the first aspect according to the present invention, the first side wall portion is formed sloping toward the vehicle body upper outside at the vehicle width direction inside of the energy absorption member, as viewed from the vehicle body longitudinal direction. The second side wall portion is formed sloping toward the vehicle body upper outside at the vehicle width direction outside of the battery frame, which is made of resin and disposed at the vehicle width direction inside of the first side wall portion, as viewed from the vehicle body longitudinal direction, and facing the first side wall portion across a gap in the vehicle width direction.

Thus, the first side wall portion of the energy absorption member is suppressed from making line contact with the second side wall portion of the battery frame during a side-on collision of the vehicle, and localized collision load is suppressed from being input to the battery frame. This accordingly suppresses cracks from occurring in the battery frame made of resin.

A vehicle battery mounting structure of a second aspect according to the present invention is the vehicle battery mounting structure of the first aspect, wherein the first side wall portion and the second side wall portion are formed parallel to each other, as viewed from the vehicle body longitudinal direction.

In the second aspect according to the present invention, the first side wall portion and the second side wall portion are formed parallel to each other, as viewed from the vehicle body longitudinal direction. Thus, the first side wall portion of the energy absorption member makes face-to-face contact with the second side wall portion of the battery frame during a side-on collision of the vehicle, and localized collision load is further suppressed or prevented from being input to the battery frame. This accordingly further suppresses cracks from occurring in the battery frame made of resin. Note that in the present invention, "parallel" encompasses both exactly parallel and substantially parallel, which may be slightly askew to exactly parallel.

A vehicle battery mounting structure of a third aspect according to the present invention is the vehicle battery mounting structure of the first or the second aspect, wherein a height position of an upper end face of the first side wall portion and a height position of an upper end face of the second side wall portion are the same.

In the third aspect according to the present invention, the height position of the upper end face of the first side wall portion and the height position of the upper end face of the second side wall portion are the same. Thus, the first side wall portion of the energy absorption member efficiently makes face-to-face contact with the second side wall portion of the battery frame during a side-on collision of the vehicle, and localized collision load is further suppressed or prevented from being input to the battery frame. This accordingly further suppresses cracks from occurring in the battery frame made of resin. Note that in the present invention, "the same" also encompasses being "substantially the same", in which the height position of one upper end face is slightly offset from the height position of the other upper end face.

A vehicle battery mounting structure of a fourth aspect according to the present invention is the vehicle battery mounting structure of any one of the first to the third aspects, wherein the battery frame includes a flange portion made of metal that projects out toward the vehicle width direction outside from the vehicle body upper side of the second side wall portion and that is fixed to a lower face side of the floor panel, and a sloped portion is formed to the flange portion from the vehicle width direction upper outside toward the vehicle width direction lower inside.

In the fourth aspect according to the present invention, the sloped portion is formed to the flange portion of the battery frame from the vehicle width direction upper outside toward the vehicle width direction lower inside. Thus, the flange portion undergoes folding deformation toward the vehicle body upper side readily during a side-on collision of the vehicle, and bending moment input to the flange portion is efficiently absorbed by bending deformation of the flange portion toward the vehicle body upper side and is suppressed or prevented from being transmitted to the battery frame. Namely, stress load applied to the battery frame from an under member through the flange portion during a side-on collision of the vehicle is reduced.

Advantageous Effects of Invention

As explained above, the first aspect according to the present invention enables cracks to be suppressed from occurring in the battery frame made of resin during a side-on collision of the vehicle.

The second aspect according to the present invention enables cracks to be further suppressed from occurring in the battery frame made of resin during a side-on collision of the vehicle.

The third aspect according to the present invention enables cracks to be further suppressed from occurring in the battery frame made of resin during a side-on collision of the vehicle.

The fourth aspect according to the present invention enables stress load applied to the battery frame from the under member through the flange portion during a side-on collision of the vehicle to be reduced.

BRIEF DESCRIPTION OF DRAWINGS

FIG. 3 is a face-on cross-section illustrating an initial state when a vehicle equipped with a vehicle battery mounting structure according to the present exemplary embodiment and a pole have collided side-on.

FIG. 4A is an enlarged face-on cross-section illustrating a state prior to a vehicle, equipped with a vehicle battery mounting structure according to the present exemplary embodiment, and a pole colliding side-on.

FIG. 4B is an enlarged face-on cross-section illustrating an initial state when a vehicle, equipped with a vehicle battery mounting structure according to the present exemplary embodiment, and a pole have collided side-on.

FIG. 5 is a face-on cross-section illustrating a later state when a vehicle, equipped with a vehicle battery mounting structure according to the present exemplary embodiment, and a pole have collided side-on.

DESCRIPTION OF EMBODIMENTS

Detailed explanation follows regarding an exemplary embodiment according to the present invention, based on the drawings. Note that for ease of explanation, in each of the drawings as appropriate, the arrow UP indicates the vehicle body upper direction, the arrow FR indicates the vehicle body front direction, and the arrow IN indicates the vehicle width direction inside. In the below explanation, unless specifically stated otherwise, reference to the vertical, longitudinal, and lateral directions refers to up and down in the vehicle body vertical direction, front and rear in the vehicle body longitudinal direction, and left and right in the vehicle body lateral direction (vehicle width direction). The left side of a vehicle body is illustrated in each of the drawings, and since the right side of the vehicle body is the same with lateral symmetry thereto, explanation regarding the right side of the vehicle body is omitted as appropriate.

Figure 1:
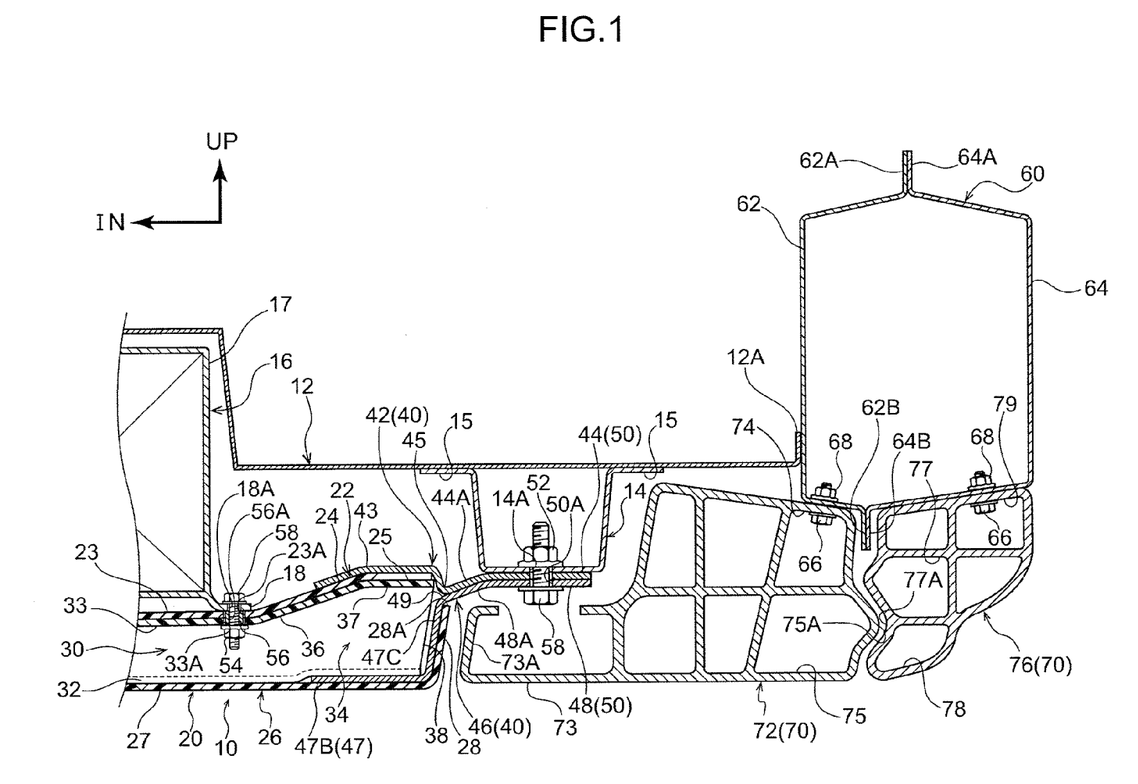
FIG. 1 is a face-on cross-section illustrating a vehicle battery mounting structure according to an exemplary embodiment.

As illustrated in FIG. 1, a left and right pair of under members (side frames) 14, which extend along the vehicle body longitudinal direction and configure a vehicle body frame structure, are joined to a lower face of a floor panel 12 made of metal that configures a floor section of the vehicle body. The under members 14 are each formed from metal with a substantially hat shaped cross-section, and have flange portions 15 jutting out in the vehicle width direction that are joined and fixed by welding or the like to the lower face at either vehicle width direction end portion side of the floor panel 12.

Each under member 14 is formed with plural through-holes 14A along the length direction (vehicle body longitudinal direction) for inserting flange bolts 58, described later. Weld nuts 52 are provided coaxially to the respective through-holes 14A at an upper face of the under member 14.

A vehicle battery mounting structure 10 according to the present exemplary embodiment applied to a vehicle such as an electric vehicle includes a battery frame (stack frame) 20 that is disposed at the vehicle body lower side of the floor panel 12 and supports a fuel cell stack 16, serving as a battery, from the vehicle body lower side. The battery frame 20 is made of fiber reinforced plastic (FRP), and is molded in carbon fiber reinforced plastic (CFRP) as an example.

An exterior section 17 of the fuel cell stack 16 is formed of metal (or may be resin) in a rectangular box shape, and plural leg portions 18 are integrally formed jutting out toward the vehicle width direction outsides at specific locations on a lower end peripheral edge portion of the exterior section 17. Through-holes 18A for inserting flange bolts 58, described later, are formed in the respective leg portions 18.

Figure 2:
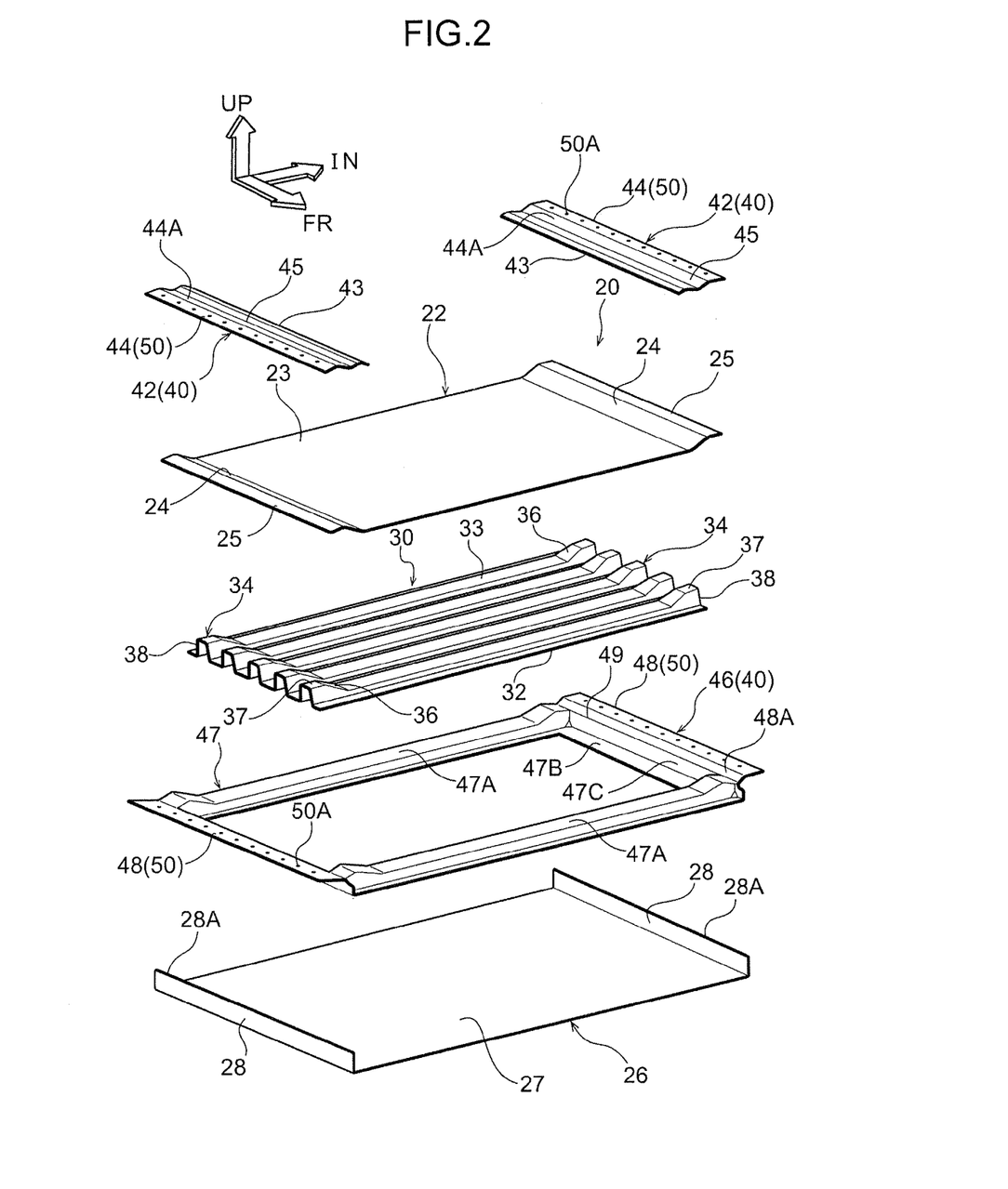
FIG. 2 is an exploded perspective view illustrating a battery frame and a ductile member configuring a vehicle battery mounting structure according to the present exemplary embodiment.

As illustrated in FIG. 1 and FIG. 2, the battery frame 20 is configured including an upper frame 22 serving as a battery frame upper, a lower frame 26 serving as a battery frame lower, and a core frame 30 serving as an intermediate member (reinforcing member) provided between the upper frame 22 and the lower frame 26.

The upper frame 22 includes a flat rectangular plate shaped top plate 23 disposed along the horizontal direction, flat rectangular plate shaped sloped walls 24, which are integrally and continuously provided sloping toward the vehicle width direction upper outsides so as to follow sloped walls 36, described later, at either vehicle width direction end portion (outside end portion) of the top plate 23, and flat rectangular plate shaped flange portions 25, which are integrally and continuously provided substantially horizontally toward the vehicle width direction outsides so as to follow upper walls 37, described later, at either vehicle width direction end portion of the sloped walls 24.

Figure 4A:
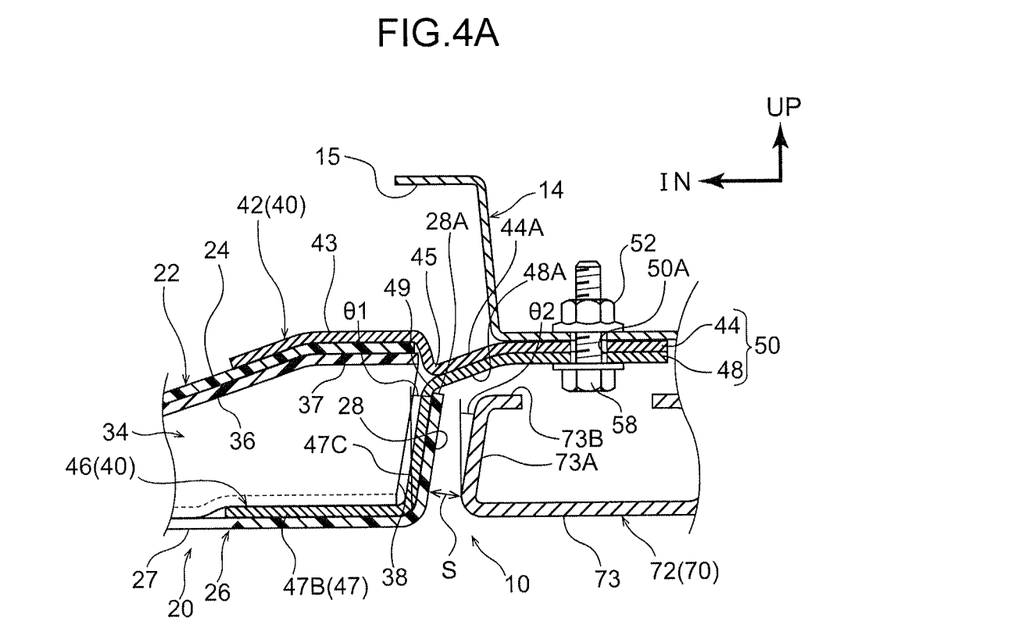

The lower frame 26 includes a flat rectangular plate shaped bottom plate 27 disposed along the horizontal direction, and flat rectangular plate shaped side wall portions 28, serving as second side wall portions which are integrally provided standing substantially perpendicular toward the vehicle body upper side, specifically, sloping slightly toward the vehicle body upper outsides as viewed from the vehicle body longitudinal direction, at either vehicle width direction end portion (outside end portion) of the bottom plate 27. Note that, as illustrated in FIG. 4A, θ1 is a slope angle θ1 of each side wall portion 28 with respect to the vertical direction, θ1 being from 3° to 10°, and θ1 being preferably from 4° to 6°.

When a lower portion ductile member 46, described later, has been joined to the lower frame 26, the height of each side wall portion 28 is a height that substantially reaches (extends) as far as a boundary portion 49 between a side wall portion 47C of a lower main body portion 47 of the lower portion ductile member 46 and a lower flange portion 48. In other words, an upper end face 28A of each side wall portion 28 is positioned at substantially the same height as an upper end face 73B of a block portion 73 of an inner member 72 of an energy absorption member 70, described later.

As illustrated in FIG. 2, the core frame 30 includes a main body portion 32 formed by protruding portions 33 with substantially hat shaped cross-sections extending along the vehicle width direction aligned in plural rows (five rows, for example) in the vehicle body longitudinal direction, and projecting portions 34, which are formed so as to project out toward the vehicle body upper side continuously from upper faces of the protruding portions 33, at either vehicle width direction end portion of the main body portion 32.

The sloped walls 36 are integrally and continuously provided sloping toward the vehicle width direction upper outsides from the upper faces of the protruding portions 33 at the vehicle width direction inside of the projecting portions 34. The upper walls 37 are integrally and continuously provided substantially horizontally toward the vehicle width direction outsides at upper end portions of the sloped walls 36. End face portions 38, each with a substantially perpendicular cross-section with respect to the main body portion 32, are configured at vehicle width direction outside end portions of the projecting portions 34. Namely, the projecting portions 34 are each formed with a substantially trapezoidal shape, as viewed from the vehicle body longitudinal direction (in face-on view).

A lower face of the top plate 23 of the upper frame 22 is joined by adhesive to the upper faces of the respective protruding portions 33 of the core frame 30, and an upper face of the bottom plate 27 of the lower frame 26 is joined by adhesive to a lower face of the main body portion 32 of the core frame 30. The battery frame 20 is broadly configured with a rectangular shaped closed cross-section in this manner.

Note that, as illustrated in FIG. 1, plural through-holes 23A, 33A that are in communication with each other are formed in specific locations of the top plate 23 of the upper frame 22 and the protruding portions 33 of the core frame 30. Flange nuts 54 that are coaxial to the respective through-holes 23A, 33A are joined by adhesive to lower faces of the protruding portions 33. Circular tube shaped collar members 56 made of metal are integrally and coaxially provided at upper faces of the respective flange nuts 54, and the respective collar members 56 are inserted into the respective through-holes 23A, 33A.

The fuel cell stack 16 is mounted on an upper face of the upper frame 22 (top plate 23) such that the through-holes 18A of the leg portions 18 and through-holes 56A of the collar members 56 are in communication with each other. The flange bolts 58 are inserted into the through-holes 18A and the through-holes 56A from the vehicle body upper side and screwed together with the flange nuts 54, thereby fastening and fixing the fuel cell stack 16 to the battery frame 20 (the upper frame 22 and the core frame 30).

As illustrated in FIG. 1 and FIG. 2, upper main body portions 43 of a left and right pair of upper portion ductile members 42 configuring the upper side of a ductile member 40 are respectively joined to upper faces of the sloped walls 24 and flange portions 25 of the upper frame 22. To explain in detail, each upper portion ductile member 42 has its length direction along the vehicle body longitudinal direction, and a lower face of the upper main body portion 43, this being a vehicle width direction inside portion of the upper portion ductile member 42, is joined by adhesive to the upper faces of the sloped wall 24 and flange portion 25 of the respective upper frame 22.

An upper flange portion 44 (this being a vehicle width direction outside portion of the respective upper portion ductile member 42) is integrally and continuously provided projecting out toward the vehicle width direction outside from the flange portion 25 of the upper frame 22 and the end face portions 38 of the core frame 30 (the battery frame 20) at a vehicle width direction outside end portion of the respective upper main body portion 43.

The lower main body portion 47 of the lower portion ductile member 46, configuring the lower side of the ductile member 40, is joined to the upper face of the bottom plate 27 of the lower frame 26. To explain in detail, the lower portion ductile member 46 includes the rectangular frame shaped lower main body portion 47. A lower face of the lower main body portion 47 (including jutting-out portions 47B, described later) is joined by adhesive to the upper face of the bottom plate 27 of the lower frame 26.

The core frame 30 is accordingly disposed inside the lower main body portion 47, and the lower face of the main body portion 32 is joined by adhesive to the upper face of the bottom plate 27 of the lower frame 26 in this state. A protruding portion 47A with a substantially hat shaped cross-section extending along the vehicle width direction is configured at either vehicle body longitudinal direction end portion of the lower main body portion 47. Upper faces of the protruding portions 47A are, together with the upper faces of the respective protruding portions 33 of the core frame 30, joined by adhesive to the lower face of the top plate 23 of the upper frame 22.

The flat rectangular plate shaped jutting-out portions 47B that jut out toward the vehicle width direction inside are integrally formed to either vehicle width direction end portion of the lower main body portion 47. The lower face at the projecting portion 34 side of the main body portion 32 of the core frame 30 is joined by adhesive to upper faces of the jutting-out portions 47B. Namely, the jutting-out portions 47B of the lower main body portion 47 are clamped and fixed between the lower frame 26 and the core frame 30.

As illustrated in FIG. 1 and FIG. 2, the side wall portions 47C, which are substantially perpendicular toward the vehicle body upper side, specifically, which slope slightly toward the vehicle body upper outsides, as viewed from the vehicle body longitudinal direction, so as to follow the side wall portions 28 of the lower frame 26, are formed at portions further toward the vehicle width direction outsides than the jutting-out portions 47B of the lower main body portion 47 of the lower portion ductile member 46. Note that, as illustrated in FIG. 4A, the slope angle of the side wall portions 47C with respect to the vertical direction is the same as the slope angle $\theta 1$ of the side wall portions 28.

The height of the side wall portions 47C is substantially the same height as that of the side wall portions 28, these being vehicle width direction outside end portions of the lower frame 26. Namely, the side wall portions 28 of the lower frame 26 extend toward the vehicle body upper side as far as positions at a height that substantially reaches the boundary portions 49 between the side wall portions 47C of the lower main body portion 47 and the lower flange portions 48.

The lower flange portions 48, which project out toward the vehicle width direction outsides from upper end portions of the end face portions 38 of the core frame 30 and the side wall portions 28 of the lower frame 26 (the battery frame 20), are integrally and continuously provided at vehicle width direction outside end portions of the side wall portions 47C. The upper flange portions 44 that project out toward the vehicle width direction outsides from the battery frame 20, and the lower flange portions 48, are superimposed on each other and joined together by adhesive (or by riveting or the like).

Namely, flange portions 50, which form fixing locations with the under members 14 (the lower face side of the floor panel 12) at the battery frame 20 side, are configured by the upper flange portions 44 and the lower flange portions 48 that are superimposed on each other and joined together. Note that the ductile member 40 (the upper portion ductile members 42 and the lower portion ductile member 46) is made of metal, and is formed of high tensile steel sheet or ultra-high tensile steel sheet as an example.

As illustrated in FIG. 1 and FIG. 2, plural through-holes 50A for inserting the flange bolts 58 are formed in communication with each other along the vehicle body longitudinal direction in the flange portions 50 configured by the upper flange portions 44 and the lower flange portions 48. The battery frame 20 is thereby fastened and fixed to the under members 14 through the ductile member 40 (the flange portions 50) by inserting the flange bolts 58 through the through-holes 50A and the through-holes 14A from the vehicle body lower side, and screwing the flange bolts 58 together with the weld nuts 52.

Figure 4B:
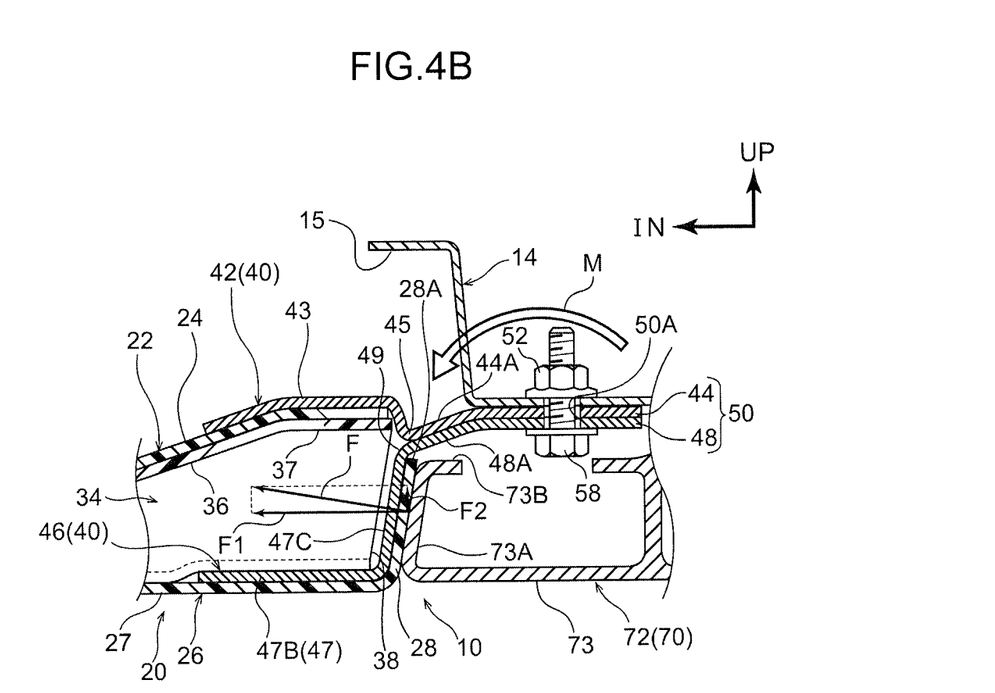

As illustrated in FIG. 1, FIG. 2, and FIG. 4B, sloped portions 44A are formed from the vehicle width direction upper outsides toward the vehicle width direction lower inside (toward boundary portions 45 between the upper main body portions 43 and the upper flange portions 44) at the upper main body portion 43 side of the upper flange portions 44, further toward the vehicle width direction outsides than the battery frame 20. The boundary portions 45 are configured as pivot points of folding deformation of the flange portions 50, described later, due to the sloped portions 44A being formed.

Note that sloped portions 48A are formed, at the same angle as the sloped portions 44A, from the vehicle width direction upper outsides toward the vehicle width direction lower inside (toward the boundary portions 49 between the lower main body portion 47 and the lower flange portions 48) at the lower main body portion 47 side of the lower flange portions 48 that are superimposed on and joined to the upper flange portions 44, further toward the vehicle width direction outsides than the battery frame 20. The boundary portions 49 are thereby, together with the boundary portions 45, configured as pivot points of folding deformation of the flange portions 50.

As illustrated in FIG. 1, a bent portion 12A is formed bending toward the vehicle body upper side at a vehicle width direction outside end portion of the floor panel 12. The bent portion 12A is joined by welding or the like to an inner panel 62 of a rocker 60 made of metal. The rocker 60 is configured including the inner panel 62 with a substantially hat shaped cross-section, and an outer panel 64 with a substantially hat shaped cross-section.

Namely, the rocker 60 is configured with a rectangular shaped closed cross-section profile, by joining an upper flange portion 64A of the outer panel 64 to an upper flange portion 62A of the inner panel 62 by welding or the like, and by joining a lower flange portion 64B of the outer panel 64 to a lower flange portion 62B of the inner panel 62 by welding or the like.

The energy absorption member 70 made of metal is disposed between the vehicle body lower side of the rocker 60 (including the respective vehicle width direction end portion of the floor panel 12) and the battery frame 20. The energy absorption member 70 is configured including an inner member 72 disposed at the vehicle width direction inside so as to be in close proximity to the side wall portion 28, and an outer member 76 disposed further toward the vehicle width direction outside than the inner member 72 by a specific gap (a gap of an amount enabling insertion of the lower flange portions 62B, 64B).

The inner member 72 is configured in a shape in which plural (seven, for example) block portions, each with a substantially rectangular closed cross-section profile (tube shape) extending along the vehicle body longitudinal direction, have been combined together to form an integral unit. As illustrated in FIG. 4A, a side wall portion 73A, serving as a first side wall portion facing the vehicle width direction inside of the block portion 73 that is furthest toward the vehicle width direction inside, is disposed in close proximity to the side wall portion 28.

To explain in detail, as viewed from the vehicle body longitudinal direction (in face-on view), the side wall portion 73A of the block portion 73 is formed sloping slightly toward the vehicle body upper outside so as to be substantially parallel to the side wall portion 28, and is disposed facing the side wall portion 28 across a slight gap (a gap with a constant interval along the extension direction of the side wall portions 28, 73A) S in the vehicle width direction. Note that the battery frame 20 and the inner member 72 may be configured assembled such that the gap S is not formed between the side wall portion 28 and the side wall portion 73A (such that the respective members are in face-to-face contact with each other).

$\theta 2$ is a slope angle of the side wall portion 73A with respect to the vertical direction, $\theta 2$ is from 3° to 10°, $\theta 2$ being preferably from 4° to 6°, and set the same as the slope angle $\theta 1$ of the side wall portion 28. As described above, the upper end face 73B of the side wall portion 73A and the upper end face 28A of the side wall portion 28 are positioned at substantially the same height. Namely, the height of the side wall portion 73A is substantially the same as the height of the side wall portion 28.

The block portion 73 is fastened and fixed by bolts and weld nuts, not illustrated in the drawings, to the respective under member 14, excluding a fastening location of the flange portions 50. A block portion 74 that is at an upper portion side furthest toward the vehicle width direction outside is fastened and fixed to the inner panel 62 of the rocker 60 by a bolt 66 and a weld nut 68. The inner members 72 are thereby disposed at the vehicle body lower side of either vehicle width direction end portion of the floor panel 12.

The outer member 76 is configured in a shape in which plural (five, for example) block portions, each with a substantially rectangular closed cross-section profile (tube shape) extending along the vehicle body longitudinal direction, have been combined together to form an integral unit. A block portion 79 at an upper portion side at the vehicle width direction outside is fastened and fixed by a bolt 66 and a weld nut 68 to the outer panel 64 of the rocker 60. The outer member 76 is thereby disposed at the vehicle body lower side of the rocker 60.

A bulge portion 75A is formed projecting out toward the vehicle width direction outside of a block portion 75 at a lower portion side furthest toward the vehicle width direction outside of the inner member 72. An indented portion 77A, which is indented toward the vehicle width direction outside so as to allow the bulge portion 75A (such that there is no contact with the bulge portion 75A), is formed at a boundary portion between a block portion 77 and a block portion 78 at the lower portion side at the vehicle width direction inside of the outer member 76.

When the outer member 76 has moved toward the inner member 72 side due to a side-on collision of the vehicle, the indented portion 77A fits together with (contacts) the bulge portion 75A, thereby enabling part of the input collision load to be efficiently transmitted from the outer member 76 to the inner member 72. Namely, the outer member 76 and the inner member 72 are configured capable of undergoing plastic deformation (being squashed) toward the vehicle width direction inside as an integral unit.

Explanation follows regarding operation of the vehicle battery mounting structure 10 configured as described above. Namely, as illustrated in FIG. 3 and FIG. 5, explanation follows regarding operation in a case in which, for example, the vehicle has been in a side-on collision with a circular column shaped (or circular tube shaped) metal pole P (barrier) extending along the vertical direction.

Figure 3:
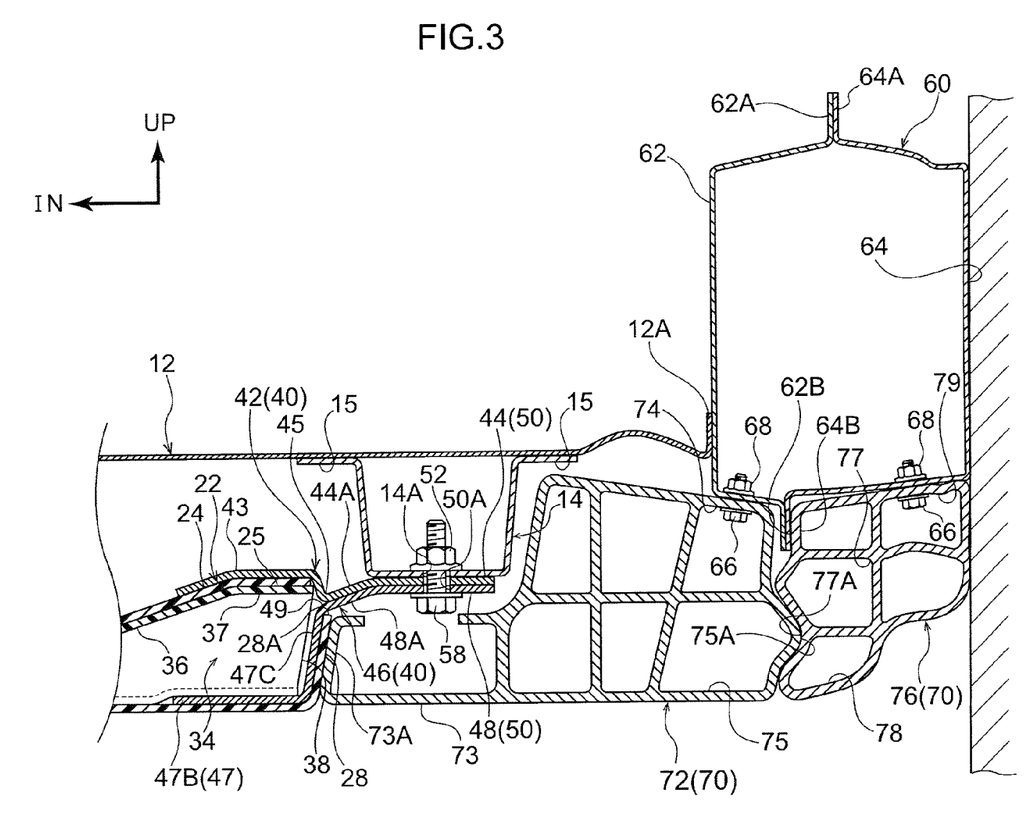
Figure 5:
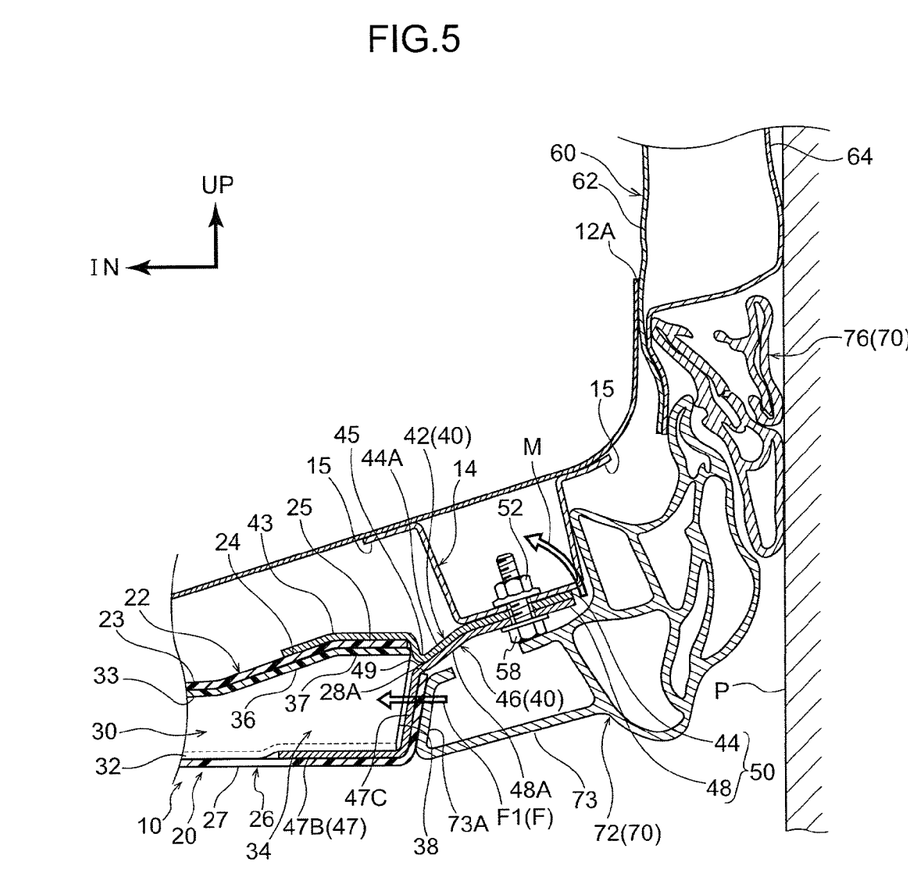

As illustrated in FIG. 3 and FIG. 5, in the case of a side-on collision between the vehicle and the pole P, an excessive collision load toward the vehicle width direction inside is input to the rocker 60 and the energy absorption member 70. When collision load is input from the vehicle width direction outside, the rocker 60 moves while undergoing plastic deformation toward the vehicle width direction inside, absorbs part of the input collision load, and transmits part of the remaining collision load to the floor panel 12.

When part of the collision load is transmitted to the floor panel 12, the vehicle width direction outside end portion of the floor panel 12 curls upward, and a vehicle width direction outside end portion of the respective under member 14 fixed to the lower face of the floor panel 12 is moved toward the vehicle body upper side. A bending moment M with its axial direction in the vehicle body longitudinal direction is thereby input to the flange portion 50 of the ductile member 40 that is fastened and fixed to the under member 14 (see also FIG. 4B).

Namely, an upward-folding force (such that a vehicle width direction outside end portion of the flange portion 50 is moved toward the vehicle body upper side) is applied to the flange portion 50 (the upper flange portion 44 and the lower flange portion 48) of the ductile member 40 fastened and fixed to the under member 14, with the boundary portion 45 between the upper main body portion 43 and the upper flange portion 44 acting as a pivot point.

Note that the flange portion 50 (ductile member 40) is ductile, due to being formed of metal (high tensile steel sheet or ultra-high tensile steel sheet). Moreover, the sloped portions 44A, 48A, which slope from the vehicle width direction upper outside toward the vehicle width direction lower inside, are formed at the upper main body portion 43 side of the upper flange portion 44 and the lower main body portion 47 side of the lower flange portion 48 configuring the flange portion 50, further toward the vehicle width direction outside than the battery frame 20. The upper flange portion 44 and the lower flange portion 48 are joined together by adhesive.

Thus, the flange portion 50 readily undergoes folding deformation toward the vehicle body upper side about the pivot point of the boundary portions 45, 49. The bending moment M input to the flange portion 50 is thereby efficiently absorbed by bending deformation of the flange portion 50 toward the vehicle body upper side, and is suppressed or prevented from being transmitted toward the battery frame 20. Namely, stress load applied toward the battery frame 20 from the under member 14 through the flange portion 50 during a side-on collision of the vehicle can be reduced or eliminated.

Since the flange portion 50 is ductile, by simply making the flange portion 50 undergo folding deformation toward the vehicle body upper side, there is no concern of breaking (breaking of the flange portion 50 is suppressed or prevented). There is accordingly no concern of the battery frame 20 separating from the under member 14, and no concern of the fuel cell stack 16 coming off the vehicle.

When collision load is input from the vehicle width direction outside, the energy absorption member 70 (the outer member 76 and the inner member 72) moves while undergoing plastic deformation toward the vehicle width direction inside, absorbs part of the input collision load, and transmits part of the remaining collision load toward the under member 14 and the battery frame 20.

Note that, if the side wall portion 73A of the block portion 73 of the inner member 72 of the energy absorption member 70 was formed sloping toward the vehicle body upper inside, for example, there would be a concern that an upper end portion of the side wall portion 73A would make line contact with the side wall portion 28 (that localized collision load would be input) when the energy absorption member 70 had moved toward the vehicle width direction inside, so that the side wall portion 28 would crack or break. There would also be a concern that the side wall portion 28 would be pressed toward the vehicle body lower side by the upper end portion of the side wall portion 73A, promoting the bending moment M.

However, as illustrated in FIG. 4A, the side wall portion 73A is formed sloping slightly toward the vehicle body upper outside so as to be substantially parallel to the side wall portion 28 in face-on view (the slope angle $\theta 1$ and the slope angle $\theta 2$ are configured the same), and is disposed facing the side wall portion 28 across the gap S with a constant interval therebetween. The height of the side wall portion 73A is substantially the same as the height of the side wall portion 28.

Thus, as illustrated in FIG. 3 and FIG. 4B, when the energy absorption member 70 moves toward the vehicle width direction inside, the side wall portion 73A efficiently face-to-face contacts (press-contacts the entire face of) the side wall portion 28, and localized collision load is suppressed or prevented from being input to the side wall portion 28 (battery frame 20). Cracking or breaking of the side wall portion 28 is thereby suppressed or prevented from occurring, and cross-sectional collapse of the battery frame 20 is suppressed or prevented from occurring.

As illustrated in FIG. 4A, the side wall portion 28 and the side wall portion 73A slope at the slope angles $\theta 1$, $\theta 2$ with respect to the vertical direction, such that, as illustrated in FIG. 4B, collision load F applied to the side wall portion 28 from the side wall portion 73A is distributed as a component force F1 in the vehicle width direction and a component force F2 toward the vehicle body upper direction.

Thus, at least part of the bending moment M input to the flange portion 50 is offset (cancelled out) by the component force F2 toward the vehicle body upper direction, and the bending moment M is further suppressed or prevented from being transmitted toward the battery frame 20. Namely, stress load that is applied toward the battery frame 20 from the under member 14 through the flange portion 50 during a side-on collision of the vehicle can be further reduced or eliminated.

As illustrated in FIG. 5, even if the energy absorption member 70 moves further toward the vehicle width direction inside, and the side wall portion 73A presses the side wall portion 28 while pivoting under the bending moment M, the collision load F (component force F1) that is input as a result is efficiently transmitted toward the vehicle width direction inside. Namely, part of the collision load input toward the vehicle width direction inside during a side-on collision of the vehicle is efficiently transmitted from the side wall portion 28 to the end face portion 38 of the core frame 30, namely, to the plural rows of protruding portions 33, and is efficiently absorbed by the plural rows of protruding portions 33. Collision load is thereby suppressed or prevented from being input to the fuel cell stack 16.

The jutting out portion 47B of the lower main body portion 47 of the lower portion ductile member 46 is clamped and fixed between the core frame 30 (main body portion 32) and the lower frame 26 (bottom plate 27). Thus, even if the flange portion 50 undergoes folding deformation toward the vehicle body upper side during a side-on collision of the vehicle, the jutting out portion 47B of the lower main body portion 47 is suppressed or prevented from coming away from the core frame 30 and the lower frame 26.

As illustrated in FIG. 5, in cases in which the flange portion 50 has undergone folding deformation toward the vehicle body upper side, force toward the vehicle body upper side is applied to a vehicle width direction outside end portion of the upper flange portion 44, such that (pressing) force toward the sloped wall 24 side is applied to the upper main body portion 43. Namely, the upper main body portion 43 is less liable to be applied with force in a direction in which the upper main body portion 43 comes away from the sloped wall 24 during a side-on collision of the vehicle. The upper main body portion 43 is accordingly suppressed or prevented from coming away from the sloped wall 24.

An indented portion (not illustrated in the drawings), formed in substantially a "U" shape (the boundary portion 45 has a substantially circular arc shape in cross-section view) or substantially a "V" shape, as viewed from the vehicle body longitudinal direction, may be formed at the upper main body portion 43 side of the upper flange portion 44 further toward the vehicle width direction outside than the battery frame 20, namely, at the boundary portion 45 between the upper main body portion 43 and the upper flange portion 44.

The vehicle width direction outside end portion of the flange portion 50 thereby readily undergoes further folding deformation toward the vehicle body upper side, with the boundary portion 45 between the upper main body portion 43 and the upper flange portion 44, namely, the indented portion, acting as a pivot point. This enables stress load applied to the battery frame 20 from the under member 14 through the flange portion 50 to be further reduced or eliminated.

The vehicle battery mounting structure 10 according to the present exemplary embodiment has been explained above based on the drawings; however, the vehicle battery mounting structure 10 according to the present exemplary embodiment is not limited to that illustrated in the drawings, and design modifications may be implemented as appropriate within a range not departing from the spirit of the present invention. For example, the ductile member 40 is not limited to being formed of high tensile steel sheet or ultra-high tensile steel sheet, and may be formed of an aluminum alloy or iron, for example, that has a certain degree of hardness.

The flange portion 50 of the ductile member 40 is not limited to a configuration of being fastened and fixed to the under member 14 that is joined and fixed to the lower face of the floor panel 12, and may, for example, be configured fastened and fixed by a bracket, not illustrated in the drawings, that is joined and fixed to the lower face of the floor panel 12 and the lower face of the under member 14.

Namely, the flange portion 50 of the ductile member 40 may be configured indirectly joined to the floor panel 12 and the under member 14. "Fastening" in the present exemplary embodiment is not limited to fastening by nuts and bolts, and configuration may be by fastening (attaching) using another fastening tool (not illustrated in the drawings).

The upper main body portions 43 and the lower main body portion 47 of the ductile member 40 are not limited to being joined by adhesive to the battery frame 20, and may be configured joined by a joining device such as a rivet.

The battery frame 20 of the present exemplary embodiment is not limited to being a member that supports the fuel cell stack 16. The battery frame 20 may be configured to also support auxiliary equipment to the fuel cell stack 16 (as well as the fuel cell stack 16), for example. The fuel cell stack 16 according to the present exemplary embodiment may be configured by a secondary battery.

The disclosure of Japanese Patent Application No. 2013-267969 is incorporated in its entirety by reference herein. All cited documents, patent applications and technical standards mentioned in the present specification are incorporated by reference in the present specification to the same extent as if the individual cited document, patent application, or technical standard was specifically and individually indicated to be incorporated by reference.

The invention claimed is:

1. A vehicle battery mounting structure comprising:
    an energy absorption member that is provided at a vehicle body lower side of a floor panel, and that includes a first side wall portion sloping toward a vehicle body upper outside at a vehicle width direction inside of the energy absorption member, as viewed from a vehicle body longitudinal direction; and
    a battery frame made of resin that is disposed at the vehicle width direction inside of the first side wall portion, that supports a battery, and that includes a second side wall portion sloping toward the vehicle body upper outside at a vehicle width direction outside of the battery frame, as viewed from the vehicle body longitudinal direction, and facing the first side wall portion across a gap in the vehicle width direction.

2. The vehicle battery mounting structure of claim 1, wherein the first side wall portion and the second side wall portion are formed parallel to each other, as viewed from the vehicle body longitudinal direction.

3. The vehicle battery mounting structure of claim 1, wherein an upper end face of the first side wall portion and an upper end face of the second side wall portion are at a same height position.

4. The vehicle battery mounting structure of claim 1, wherein:
    the battery frame includes a flange portion made of metal that projects out toward the vehicle width direction outside from a vehicle body upper side of the second side wall portion and that is fixed to a lower face side of the floor panel; and
    a sloped portion is formed to the flange portion from a vehicle width direction upper outside toward a vehicle width direction lower inside.

* * * * *